(No Model.)

C. WARREN.
PLUMB LEVEL.

No. 600,326. Patented Mar. 8, 1898.

WITNESSES:
Harry S. Rohrer.
L. C. Stockbridge

INVENTOR,
Charles Warren,
BY John Wedderburn
ATTORNEY.

UNITED STATES PATENT OFFICE.

CHARLES WARREN, OF ROUGH AND READY, CALIFORNIA.

PLUMB-LEVEL.

SPECIFICATION forming part of Letters Patent No. 600,326, dated March 8, 1898.

Application filed November 23, 1896. Serial No. 613,218. (No model.)

*To all whom it may concern:*

Be it known that I, CHARLES WARREN, a citizen of the United States, residing at Rough and Ready, in the county of Nevada and State of California, have invented certain new and useful Improvements in Levels; and I do hereby declare the following to be a full, clear, and exact description of the invention, such as will enable others skilled in the art to which it appertains to make and use the same.

My invention relates to levels.

My object is to provide a more simple and cheap combined level and compass which will be extremely accurate and not liable to get out of order, being of small size and compact arrangement.

Having this object in view, my invention consists of a combined compass and level comprising certain new features and novel combinations appearing more in detail hereinafter.

Figure 1:
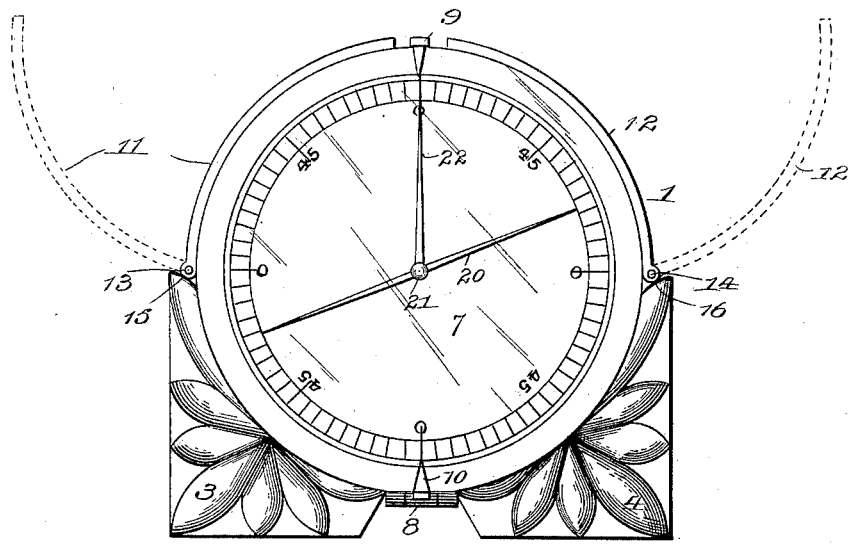
Figure 2:
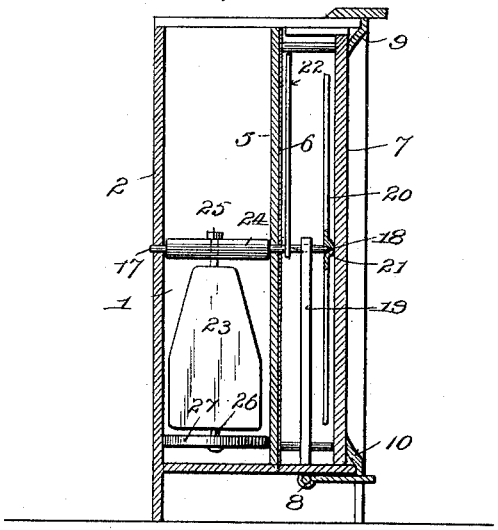

In the accompanying drawings, Figure 1 is a front view of my improved device, dotted lines showing the curved sights open; and Fig. 2, a sectional elevation.

The numeral 1 designates the casing of the device, said casing being provided with a back 2 and ornamental front pieces 3 and 4, which constitute legs.

The numeral 5 designates a partition which extends longitudinally of said casing, and 6 is a dial which is secured to the outer face of said partition.

The numeral 7 represents a circular glass door which is hinged to the casing at 8, so that it can be readily opened whenever desirable. At the top and the bottom of the dial there are two pointers 9 and 10, which are exactly at right angles to the base of the casing and in alinement with the zero-marks of the dial.

At 11 and 12 are shown two curved sights, which are hinged at 13 and 14, respectively, and constitute, when closed, a portion of the cylindrical part of the casing. These sights when opened out, as shown in dotted lines, abut on shoulders 15 and 16 of the casing, and their upper ends are then at the same distance vertically from the base of the casing, so that these sights can be used as a level. Journaled in the back 2 and partition 5 is a spindle 17, which projects out to very near the glass door and is made conical on this end, as at 18.

The numeral 19 designates a support which extends vertically and in which is journaled the outer end of the spindle.

At 20 is shown a compass-needle, which is provided with the usual conical cap 21, into which projects the conical end 18 of the spindle, said compass-needle lying close to the glass door.

The numeral 22 designates a pointer which is secured to the spindle and adapted to move before the face of the dial. A weight 23 is located between the back and partition of the casing and is hung from a sleeve 24, which is securely fastened to the spindle by a screw 25 in such position that when the casing is perfectly level the pointer will lie in alinement with the zero-marks of the dial. A short spindle 26 projects from the lower end of this weight, and on this spindle is journaled a roller 27, which is adapted to travel along the walls of the back and partition, so that the weight is prevented from coming in contact therewith, which would tend to impair the operation of the device.

When the instrument is to be used to plumb a wall or other object, it is placed thereon, whereupon the weight will shift if the structure is out of plumb and the pointer will indicate on the dial the angle of inclination. The compass operates as usual. The hinged sights are adapted to fold tightly when not in use; but when it is necessary to sight at a distant object these are spread out, as shown in dotted lines, and the pointer by its indication will show the angle of elevation or depression of the object sighted at.

Slight and immaterial changes of construction might be resorted to by one skilled in the art to which my invention appertains without detracting from any of its advantages, and hence it is to be understood that I do not limit myself to the precise construction herein shown and described, but consider that I am entitled to all such variations as come within the spirit and scope of the invention.

Having thus described my invention, what I claim as new, and desire to secure by Letters Patent, is—

In an instrument of the class described, the combination with a casing, and a dial connected thereto, of a spindle journaled in the casing, a weight connected to said spindle, a pointer also connected to the spindle and adapted to indicate on the dial, and a compass-needle journaled on the spindle and adapted to move on the face of the dial.

In testimony whereof I have signed this specification in the presence of two subscribing witnesses.

CHARLES WARREN.

Witnesses:
J. W. GILBERT,
T. M. HARRIS.